United States Patent
Berkman

[15] 3,704,527
[45] Dec. 5, 1972

[54] MECHANICAL TRANSFER TEACHING SYSTEM WITH UNIVERSAL MOUNTINGS

[72] Inventor: Stephen A. Berkman, 68 Barnsdale Rd., Wayne, N.J.
[22] Filed: April 6, 1970
[21] Appl. No.: 25,751

[52] U.S. Cl. ................................................35/13
[51] Int. Cl. ............................................G09b 25/02
[58] Field of Search .....35/13, 10, 19 R, 19 B; 46/28; 287/58

[56] References Cited

UNITED STATES PATENTS

| 3,212,200 | 10/1965 | Lundberg | 35/13 |
| 3,102,742 | 9/1963 | Shurcliff | 287/58 R |
| 3,469,870 | 9/1969 | Barkus | 287/58 R |
| 2,692,443 | 10/1954 | Milligan | 35/13 |

FOREIGN PATENTS OR APPLICATIONS

| 844,513 | 7/1952 | Germany | 35/10 |

Primary Examiner—Wm. H. Grieb
Attorney—Gerald Weir

[57] ABSTRACT

A mechanical transfer teaching system including a planar base having a plurality of parallel grooves therein, a plurality of shaft support bases slidably disposed within and interlocked with said grooves, one or more shaft supports perpendicular to each shaft support base and rotatably attached thereto, which shaft support base and shaft support serve as a universal mounting to which mechanical transfer elements can be interchangably attached.

2 Claims, 2 Drawing Figures

PATENTED DEC 5 1972 3,704,527

MECHANICAL TRANSFER TEACHING SYSTEM WITH UNIVERSAL MOUNTINGS

BACKGROUND OF THE INVENTION

This invention relates to teaching apparatus and more particularly to a versatile device for teaching fundamental as well as complex mechanical systems.

Mechanical transfer teaching systems have long been needed to demonstrate the various known means by which rotational and translational energy can be mechanically transferred and converted into other forms of mechanical output. Typical of such mechanical systems are gear trains, including worm, planetary and differential drive systems; variable speed cone and disc drives; indexing, geneva and ratchet drives; cam, crank and connecting rod, rack and pinion drives and combinations of the heretofore mentioned drive systems. Although numerous mechanical transfer systems are utilized in industry, a limited number of basic mechanical energy transfer elements such as gears and shafts are required to form any given mechanical system. For this reason, training devices which can be assembled and disassembled to show various mechanical energy transfer arrangements can be highly useful in the classroom as a teaching aid.

While certain two dimensional teaching systems have been suggested from time to time, they have not been entirely satisfactory as a classroom tool. Such systems typically make use of a peg board mounting having fixed holes therein for setting up a given demonstration. This type of system is usually limited to a small number of simple gear and cam demonstrations which can be constructed in a single plane parallel with the plane of the peg board, by inserting short gear or cam shafts into the peg board holes and then attaching the gears or cams to such shafts. A major disadvantage of the peg board type teaching system is that it cannot be used to demonstrate three dimensional systems, for example, a typical worm gear arrangement wherein the respective shafts are spaced at 90° from each other rather than in a single plane.

In summary, the two dimensional teaching devices of the prior art are capable of demonstrating only a limited number of simple mechanical systems.

OBJECTS

An object of the invention is to provide a teaching device for demonstrating a substantial number of mechanical systems.

Another object is to provide a teaching device which is capable of demonstrating both two dimensional as well as three dimensional mechanical systems.

A further object is to provide a teaching device including a universal mounting which can be used in combination with interchangeable mechanical elements in order to construct a wide variety of mechanical systems using a minimum number of parts.

A still further object of this invention is to provide a universal mounting which when used in combination with a planar, grooved base is capable of accommodating any mechanical transfer system configuration.

Other objects will be apparent from the disclosure and appended claims.

SUMMARY OF THE INVENTION

According to the invention, a mechanical transfer teaching system is provided and includes a planar base having a plurality of spaced parallel grooves therein. A plurality of shaft support members are provided which are adapted to be slideably moved to any desired position within the grooves. Each of the shaft support members are capable of receiving interchangeable shafts which in turn may receive a wide variety of interchangeable mechanical transfer elements such as gears, cams, cones, wheels, etc. Means are also provided for locking the shaft support members in any desired position within the grooves. Each shaft support member is preferably made up of a planar shaft support base and at least one shaft support post adapted to extend upwardly from the base. Each shaft support base is adapted to interlock with any of the grooves such that the same cannot be lifted vertically away from the groove. Preferably, means are provided whereby each shaft support post may be rotatably mounted to the shaft support base. This feature will permit the transfer elements supported by the shaft support posts to be located in any position within 360°. Further, since the shaft support members can be moved to any position along the grooves of the planar base, substantially universal positioning of mechanical transfer elements can be achieved by the teaching device of the invention. As will be explained hereinafter, at least some of the shaft support members are formed with their shaft support posts constructed from two rods which are telescopically arranged with respect to one another. By means of a set screw, the height of each transfer element can be adjusted to a range of positions, thus providing further flexibility in the construction of mechanical system arrangements.

DETAILED DESCRIPTION

Figure 1:
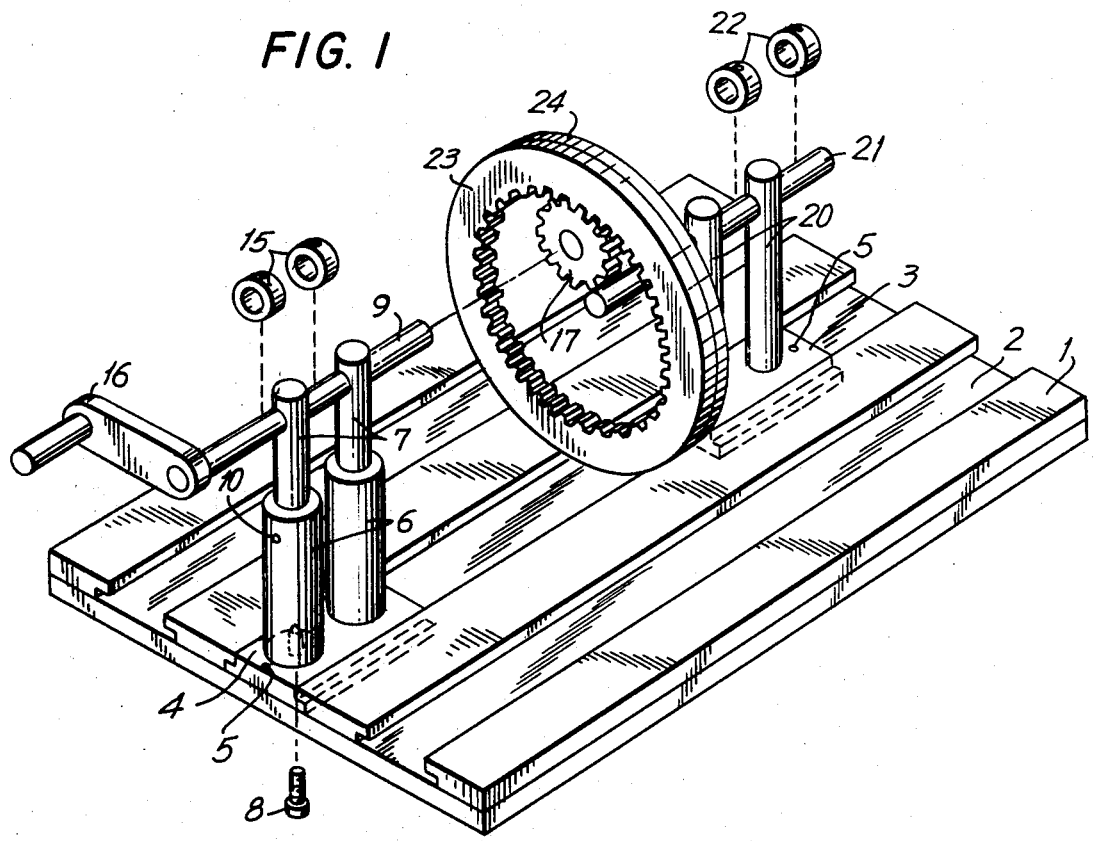
FIG. 1 shows a spur and ring gear mechanical transfer system in an exploded, perspective view, the same illustrating an exemplary mechanical system which may be constructed using the teaching device of the invention.

FIG. 1 shows a spur and ring gear mechanical transfer teaching system including a base 1 having spaced parallel grooves 2 therein. Shaft support bases 3 and 4 are disposed within one of grooves 2 and are arranged to dovetail or interlock with the groove edges such that they can move only within the groove and cannot be vertically removed therefrom. The shaft support bases 3 and 4 can be locked in position by means of set screws 5. In this embodiment the shaft support bases are arranged to receive two shaft supports each. Shaft support base 4 is provided with shaft support posts, each of which is formed with lower shaft rods 6 and upper shaft rods 7 arranged in telescoping relationship to one another. Lower shaft rods 6 are rotatably attached to shaft support base 4 by means of a bolt which is axially aligned with the lower shaft rod 6 and seats in the shaft support base, engaging a threaded axially aligned hole in the lower shaft rod 6. This is exemplified by bolt 8. Upper shaft rods 7 are provided with support means at their upper ends to accommodate shaft 9. Said means includes holes through the upper shaft rods 7 perpendicular to the shaft rod's longitudinal axes. Upper and lower shaft rods may be fastened together by means of set screws 10. Shaft collars 15 are provided with set screws and fasten around shaft 9 on both sides of one of the upper shaft rods 7 such that shaft 9 will not freely translate through the upper shaft rods along its longitudinal axis. Mechanical energy transfer elements comprising crank 16 and spur gear 17 are in turn attached to shaft 9 and are supported by the mounting means comprising upper shaft rods 7, lower shaft rods 6, and shaft support base 4. Shaft support base 3 is also provided with two shaft support posts 20 which are different from the telescoping type shown as upper and lower shaft rods 6 and 7. As can be seen from FIG. 1, shaft support posts 20 provide support for shaft 21 which in turn is held from longitudinal translation by shaft collars 22 and which shaft attaches to ring gear 23 mounted on base 24. Shaft support posts 20 are rotatably attached to shaft support base 3 by means of bolts which pass through and are flush with the bottom of shaft support base 3, the same being arranged as heretofore described using bolt 8. For maximum versatility it is preferred that upper shaft rods 7 and shaft support posts 20 be interchangeable. A preferred embodiment of this invention would provide shaft support posts which are compatible with either the shaft support base mountings or lower shaft support rods.

Figure 2:
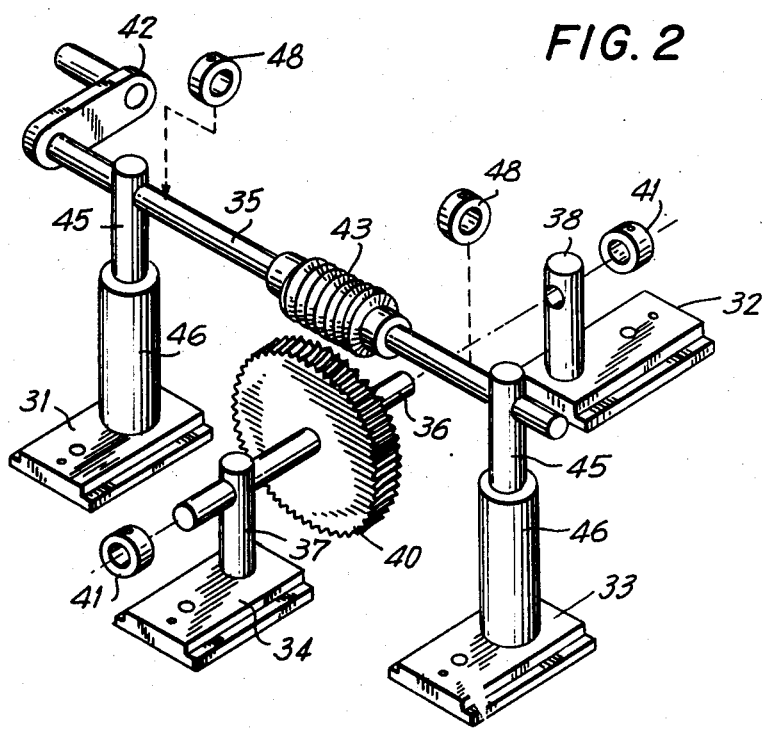
FIG. 2 shows a worm gear mechanical transfer system in an exploded, perspective view, illustrating another typical mechanical system which may be constructed using the device of the invention.

In FIG. 2, the grooved base is not shown, however the shaft support bases 31, 32, 33, and 34 are coplanar and are arranged to align their respective shaft support posts such that shafts 35 and 36 have their longitudinal axes at right angles to one another. As can be seen, shaft support posts 37 and 38, which are rotatably attached to shaft support bases 34 and 32 respectively, provide support for shaft 36 which in turn supports a mechanical energy transfer element or worm gear 40. Shaft 36 is provided as were shafts 9 and 21 in FIG. 1, with shaft collars identified as members 41. The remaining mechanical energy transfer elements comprising a crank 42 and a worm 43 are supported by shaft 35 which in turn is supported by upper shaft support rod 45 and lower shaft support rod 46. Lower shaft support rods 46 are attached to shaft support bases 31 and 33 by the bolt method described heretofore. Longitudinal translation of shaft 35 is prevented by the attachment of shaft collars 48.

While the invention has been specifically described in connection with the mechanical transfer system arrangements shown in the drawings, it should be evident that many obvious variations may be made and that some parts may be used without others without departing from the spirit and scope of the invention. For example, shaft support bases of this invention can be arranged to accommodate one or more shaft support posts. Although the connection between shaft support bases and shaft support posts is preferably a rotatable one, it is possible to arrange for the same to have one or more indexed positions such that, for example, if there were two index positions for the attachment between a shaft support base and a shaft support post which were at right angles to each other, then the embodiments shown in FIGS. 1 and 2 could be accommodated without need for the same to be rotatable. In this arrangement, however, it should be understood that it would not be possible to accommodate the mounting of a variable speed cone drive or other mechanical systems requiring angular shaft alignment other than parallel or 90°, because the mounting would have to accommodate angularity other than the two indexed alignments previously described by example.

What is claimed is:

1. In a mechanical transfer teaching system having a planar base with a plurality of parallel grooves therein, the improvement comprising a plurality of shaft support members adapted to be slideably moved to any desired position within said grooves; each of said shaft support members comprising a planar shaft support base adapted to interlock with one of said grooves and at least one shaft support post adapted to extend upwardly from said shaft support base and means for rotatably mounting the post to the shaft support base; each of said shaft support members being adapted to receive interchangeable mechanical transfer elements; and means for locking said transfer support members in desired positions in said grooves.

2. A mechanical transfer teaching system as claimed in claim 1 wherein at least one of said posts is comprised of an upper shaft support rod and a lower shaft support rod arranged in telescoping relationship with each other.

* * * * *